United States Patent
Watano (10) Patent No.: US 9,442,200 B2
(45) Date of Patent: Sep. 13, 2016

(54) RADIATION IMAGE DETECTION DEVICE AND METHOD FOR MANUFACTURING SAME

(71) Applicant: FUJIFILM Corporation, Tokyo (JP)

(72) Inventor: Hirotaka Watano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 174 days.

(21) Appl. No.: 14/339,493

(22) Filed: Jul. 24, 2014

(65) Prior Publication Data

US 2015/0060678 A1 Mar. 5, 2015

(30) Foreign Application Priority Data

Aug. 29, 2013 (JP) .................................. 2013-178185

(51) Int. Cl.
*G01T 1/202* (2006.01)
*G01T 1/20* (2006.01)

(52) U.S. Cl.
CPC ............. *G01T 1/202* (2013.01); *G01T 1/2018* (2013.01); *Y10T 29/49* (2015.01)

(58) Field of Classification Search
CPC .................................. G01T 1/20; G01T 1/202
See application file for complete search history.

(56) References Cited

U.S. PATENT DOCUMENTS

| | | | |
|---|---|---|---|
| 2006/0033031 A1* | 2/2006 | Takeda | G01T 1/2018 250/370.11 |
| 2006/0033032 A1* | 2/2006 | Inoue | G01T 1/2018 250/370.11 |
| 2008/0035852 A1* | 2/2008 | Nagata | G01T 1/2002 250/370.11 |
| 2013/0026372 A1* | 1/2013 | Nabeta | G01T 1/2002 250/366 |

FOREIGN PATENT DOCUMENTS

JP 2006-078471 A 3/2006

OTHER PUBLICATIONS

Japanese Office Action, dated Jun. 24, 2015, for Japanese Application No. 2013-178185, with an English translation.

* cited by examiner

*Primary Examiner* — Casey Bryant
(74) *Attorney, Agent, or Firm* — Birch, Stewart, Kolasch & Birch, LLP (57) ABSTRACT

There are provided a method for manufacturing a radiation image detection device, which can cover a scintillator without damaging the scintillator and which can easily form a scintillator protection film with a peripheral portion having a high adhesion to a substrate, and the radiation image detection device. A scintillator protection film that covers a planar scintillator provided on a photoelectric conversion panel is brought into close contact with a scintillator and the photoelectric conversion panel by a planar member having a surface with an irregular shape, and an irregular shape is formed on the scintillator protection film along the irregular shape of the planar member. A distance S between recesses of the irregular shape, the diameter D of the columnar crystal, and the width W of the peripheral portion satisfy the relationship of "D≤S≤W".

16 Claims, 10 Drawing Sheets

RADIATION IMAGE DETECTION DEVICE AND METHOD FOR MANUFACTURING SAME

CROSS-REFERENCE TO RELATED APPLICATIONS

The present application claims priority under 35 U.S.C. §119 to Japanese Patent Application No. 2013-178185, filed Aug. 29, 2013. Each of the above application(s) is hereby expressly incorporated by reference, in its entirety, into the present application.

BACKGROUND OF THE INVENTION

1. Field of the Invention

The present invention relates to a radiation image detection device and a method for manufacturing the same that are used in radiation imaging.

2. Description of the Related Art

In recent years, in the medical field, a radiation image detection device that emits radiation (for example, X-rays) from a radiation source toward an imaging region of a subject (patient) and converts the radiation transmitted through the subject into electric charges to generate a radiation image is used to perform diagnostic imaging. There are a direct conversion type radiation image detection device, which directly converts a radiation into electric charges, and an indirect conversion type radiation image detection device, which converts radiation into visible light first and converts the visible light into electric charges.

The indirect conversion type radiation image detection device includes a scintillator (phosphor layer) that absorbs radiation and converts the radiation into visible light and a photoelectric conversion panel that detects the visible light and converts the visible light into electric charges. For the scintillator, cesium iodide (CsI) or gadolinium oxysulfide ($Gd_2O_2S$: GOS) is used. The photoelectric conversion panel is formed by arraying thin film transistors and photodiodes in a matrix on the surface of the glass insulating substrate.

In the case of CsI, the manufacturing cost is high compared with GOS. However, since CsI has high conversion efficiency of radiation to visible light and has a columnar crystal structure, the SN ratio of image data is improved by the light guide effect. Accordingly, CsI is used especially for a scintillator of a high-end radiation image detection device.

For the radiation image detection device that uses CsI for a scintillator, a bonding method and a direct deposition method are known. In the bonding method, a deposition substrate having a deposited scintillator and a photoelectric conversion panel are bonded to each other with an adhesive layer interposed therebetween so that the scintillator faces the photoelectric conversion panel. In the direct deposition method, a scintillator is deposited directly on the photoelectric conversion panel. In the bonding method, since the distal end of the columnar crystal of CsI is close to the photoelectric conversion panel and visible light emitted from the distal end is efficiently incident on the photoelectric conversion panel, a high-resolution radiation image is obtained. However, the bonding method requires a deposition substrate. Therefore, since the number of manufacturing steps is increased, the cost is increased.

In contrast, the direct deposition method does not require the deposition substrate. For this reason, the number of manufacturing steps is small, and the cost is low. In the direct deposition method, since the distal end of the columnar crystal of CsI is disposed on the opposite side to the photoelectric conversion panel, the quality of a radiation image is slightly inferior to that in the case of the bonding method, but is better than that in a case where the scintillator is formed of GOS. For this reason, the direct deposition method is well balanced in terms of performance and cost.

Since CsI is dissolved by moisture, that is, has a deliquescence, a scintillator formed of CsI is covered with a scintillator protection film having a moisture-proof property. For example, in the radiation image detection device disclosed in JP2006-078471A, a scintillator deposited directly on a photoelectric conversion panel is covered with a scintillator protection film formed of hot melt resin, and a peripheral portion of the scintillator protection film is in close contact with the substrate (photoelectric conversion panel). The peripheral portion of the scintillator protection film is brought into close contact with the substrate by performing hot pressing that is to press the target more strongly than other portions while applying heat.

In addition, in the method for manufacturing a radiation image detection device disclosed in JP2006-078471A, when covering the scintillator with a scintillator protection film, first and second steps are used. In the first step, a sheet-like scintillator protection film formed of hot melt resin is made to face the scintillator deposited directly on the photoelectric conversion panel, and the scintillator protection film is brought into close contact with the scintillator and the photoelectric conversion panel by the diaphragm rubber of a vacuum bonding device. In the second step, the peripheral portion of the scintillator protection film is hot-pressed using a heat pressing device.

SUMMARY OF THE INVENTION

As described above, since the method for manufacturing a radiation image detection device disclosed in JP2006-078471A requires two steps of the first step using a vacuum bonding device and the second step using a heat pressing device in order to cover the scintillator with a scintillator protection film, manufacturing time and manufacturing cost are increased.

Therefore, it can be considered to cover the scintillator with a scintillator protection film using only the first step and omitting the second step. However, when covering the scintillator with the scintillator protection film and bringing the peripheral portion of the scintillator protection film into close contact with the substrate using only the first step, in order to increase the adhesion of the peripheral portion of the scintillator protection film, it is necessary to press the entire scintillator protection film strongly against the scintillator using the diaphragm rubber of the vacuum bonding device. In this case, since the scintillator is strongly pressed by the scintillator protection film, the scintillator may be damaged.

It is an object of the invention to provide a method for manufacturing a radiation image detection device, which can cover a scintillator without damaging the scintillator and which can easily form a scintillator protection film with a peripheral portion having high adhesion to a substrate, and the radiation image detection device.

In order to solve the aforementioned problem, according to an aspect of the invention, a radiation image detection device includes a planar scintillator that converts radiation into visible light, a substrate that supports the scintillator, and a scintillator protection film. The scintillator protection film includes a covering portion that covers a surface of the scintillator and a peripheral portion that is in close contact with the substrate around the scintillator. The covering portion and the peripheral portion of the scintillator protection film are brought into close contact with the scintillator and the substrate by a planar member having a surface with an irregular shape. As a result, the irregular shape is formed on the covering portion and the peripheral portion of the scintillator protection film.

Preferably, the planar member is a sponge with a closed cell structure. Preferably, in the irregular shape of the scintillator protection film, a height from a recess to a projection of the surface irregularities is 5 μm to 30 μm.

Preferably, the scintillator protection film is an adhesive or hot melt resin.

Preferably, the scintillator has a plurality of columnar crystals. Preferably, in the irregular shape of the scintillator protection film, a distance between recesses of the surface irregularities is larger than a diameter of the columnar crystal and is smaller than a width of the peripheral portion.

Preferably, the substrate is a photoelectric conversion panel in which a plurality of pixels, which generate electrical charges by photoelectric conversion, are disposed, and the scintillator is deposited on the photoelectric conversion panel.

Preferably, the scintillator protection film includes a scintillator protection layer that protects the scintillator, a light reflection layer, that is provided on an outer side of the scintillator protection layer and reflects visible light emitted from the scintillator, and a reflective layer protection layer provided on an outer side of the light reflection layer.

Preferably, in the irregular shape of the light reflection layer, a distance between recesses of the surface irregularities is larger than an average thickness of the scintillator protection layer.

In order to solve the aforementioned problem, according to another aspect of the invention, a method for manufacturing a radiation image detection device is a method for manufacturing a radiation image detection device that includes a planar scintillator for converting radiation into visible light and generates a radiation image by performing photoelectric conversion of the visible light. The method for manufacturing a radiation image detection device includes: providing a sheet-like scintillator protection film, which includes a covering portion that covers a scintillator provided on a substrate and a peripheral portion that is in close contact with the substrate at a periphery of the covering portion, so as to face the scintillator; and forming an irregular shape on the scintillator protection film by bringing the covering portion and the peripheral portion into close contact with the scintillator and the substrate using a planar member having a surface with an irregular shape.

Preferably, the planar member is a sponge with a closed cell structure, and the scintillator protection film is pressed with a pressure of 0.1 Mpa to 0.8 Mpa.

According to the invention, the irregular shape of the planar member is formed on the scintillator protection film when bringing the scintillator protection film into close contact with the scintillator. Therefore, even if a hot pressing portion is not formed unlike in the related art, the peripheral portion can be brought into close contact with the substrate by the strong force applied when the recess of the irregular shape is formed in the peripheral portion.

DESCRIPTION OF THE PREFERRED EMBODIMENTS

Figure 1:
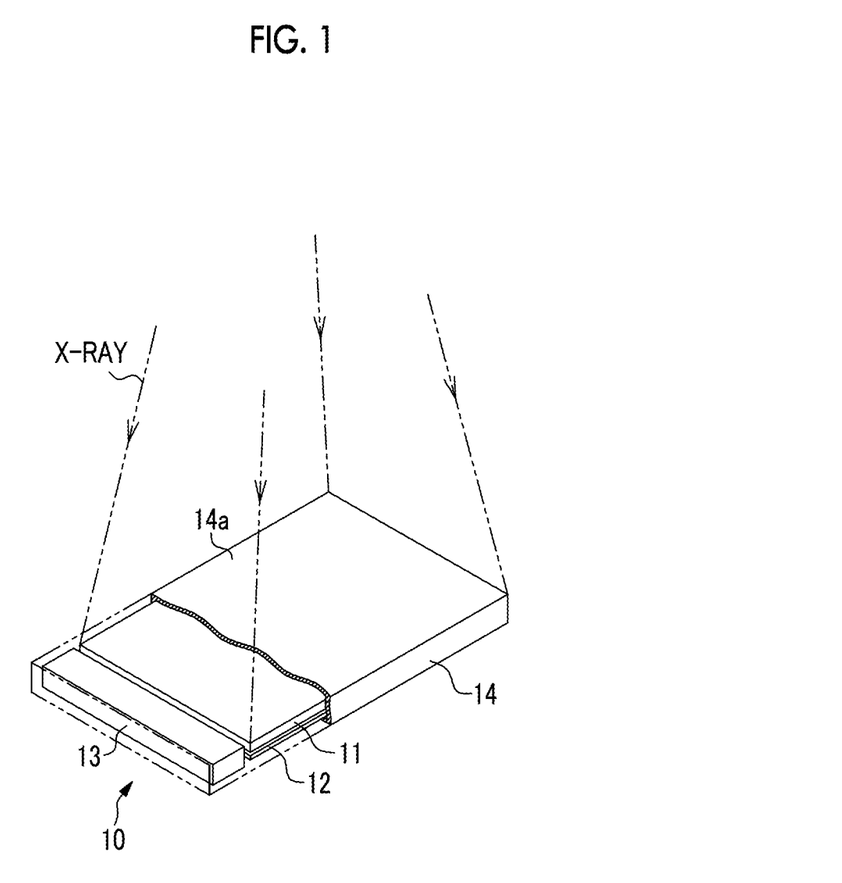
FIG. 1 is a partially broken perspective view of an X-ray image detection device.

In FIG. 1, an X-ray image detection device 10 that is an example of a radiation image detection device is configured to include a flat panel detector (FPD) 11, a support substrate 12, a control unit 13, and a housing 14 in which these are housed. The housing 14 is a monocoque structure that is integrally formed of carbon fiber reinforced plastic (carbon fiber) that has high X-ray transparency and high durability and is lightweight.

An opening (not shown) is formed on one side surface of the housing 14, and a lid (not shown) is attached so as to cover the opening. When manufacturing the X-ray image detection device 10, the FPD 11, the support substrate 12, and the control unit 13 are inserted into the housing 14 through the opening.

An upper surface 14a of the housing 14 is an irradiation surface irradiated with X-rays that are emitted from an X-ray source (not shown) and are transmitted through a subject (not shown).

Since the X-ray image detection device 10 is portable similar to an X-ray film cassette in the related art and can be used in place of the X-ray film cassette, the X-ray image detection device 10 is called an electronic cassette.

In the housing 14, the FPD 11 and the support substrate 12 are disposed in order from the irradiation surface 14a side. The support substrate 12 holds a circuit board 25 (refer to FIG. 2) on which an integrated circuit (IC) chip for performing signal processing and the like is mounted, and is fixed to the housing 14. The control unit 13 is disposed on one end side along the lateral direction in the housing 14.

A microcomputer or a battery (neither is shown) is housed in the control unit 13. The microcomputer controls the operation of the FPD 11 by communicating with a console (not shown), which is connected to the X-ray source, through a cable or wireless communication unit (not shown).

Figure 2:
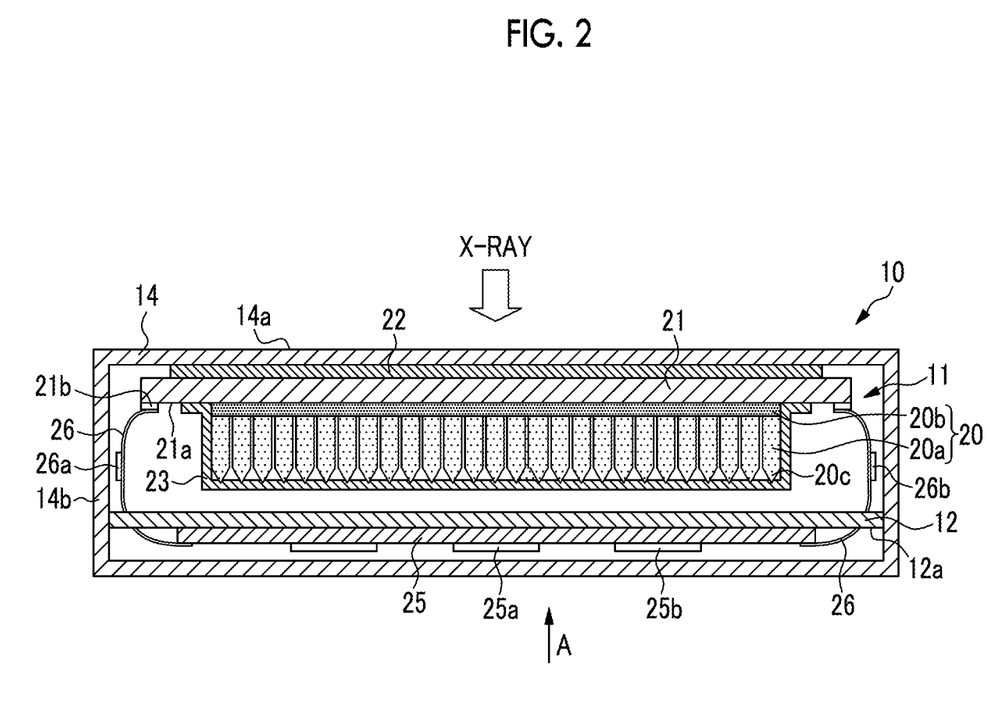
FIG. 2 is a cross-sectional view of the X-ray image detection device.

In FIG. 2, the FPD 11 includes a planar scintillator 20 that converts X-rays into visible light and a photoelectric conversion panel 21 that converts the visible light into electric charges. The X-ray image detection device 10 is of an irradiation side sampling (ISS) type, and the photoelectric conversion panel 21 is disposed so as to be closer to the X-ray incidence side than the scintillator 20 is. The scintillator 20 generates visible light by absorbing X-rays transmitted through the photoelectric conversion panel 21. The photoelectric conversion panel 21 receives the visible light emitted from the scintillator 20, and generates electric charges by performing photoelectric conversion.

The X-ray incidence side of the photoelectric conversion panel 21 is bonded to the irradiation surface 14a side of the housing 14 through an adhesive layer 22 formed of polyimide or the like. A scintillator base film 38 (refer to FIG. 4) for forming the scintillator 20 is provided at the surface layer of the photoelectric conversion panel 21.

The scintillator 20 is formed by depositing thallium-activated cesium iodide (CsI:Tl) on a surface 21a of the photoelectric conversion panel 21 (surface of the scintillator base film 38). The scintillator 20 is formed by a plurality of columnar crystals 20a and a non-columnar crystal layer 20b, and the non-columnar crystal layer 20b is formed on the photoelectric conversion panel 21 side. The columnar crystals 20a are obtained by crystal growth from the non-columnar crystal layer 20b, and has a distal end 20c on the opposite side to the non-columnar crystal layer 20b.

A plurality of columnar crystals 20a are formed on the non-columnar crystal layer 20b, and each columnar crystal 20a is separated from the adjacent columnar crystal 20a with an air layer interposed therebetween. Since the refractive index of the columnar crystal 20a is about 1.81 which is larger than the refractive index (about 1.0) of the air layer, the columnar crystal 20a shows a light guide effect. By the light guide effect, most of the visible light generated in each columnar crystal 20a propagates through the columnar crystal 20a, and is incident on the photoelectric conversion panel 21 through the non-columnar crystal layer 20b. In order to prevent the deliquescence of the columnar crystal 20a and the non-columnar crystal layer 20b, a scintillator protection film 23 having a moisture-proof property is provided in the scintillator 20.

The support substrate 12 is disposed on the opposite side to the X-ray incidence side of the scintillator 20. A gap is provided between the support substrate 12 and the scintillator 20. The support substrate 12 is fixed to a side portion 14b of the housing 14 by screws or the like. The circuit board 25 is fixed to a bottom surface 12a of the support substrate 12 not facing the scintillator 20 through an adhesive or the like.

The circuit board 25 and the photoelectric conversion panel 21 are electrically connected to each other through a flexible printed circuit board 26. The flexible printed circuit board 26 is connected to an external terminal 21b, which is provided at the end of the photoelectric conversion panel 21, using a so-called tape automated bonding (TAB) bonding method.

A gate driver 26a for driving the photoelectric conversion panel 21 or a charge amplifier 26b for converting electric charges output from the photoelectric conversion panel 21 into a voltage signal is mounted as an integrated circuit (IC) chip on the flexible printed circuit board 26. A signal processor 25a, which generates image data based on the voltage signal converted by the charge amplifier 26b, or an image memory 25b, which stores the image data, is mounted on the circuit board 25 (refer to FIG. 8).

Figure 3:
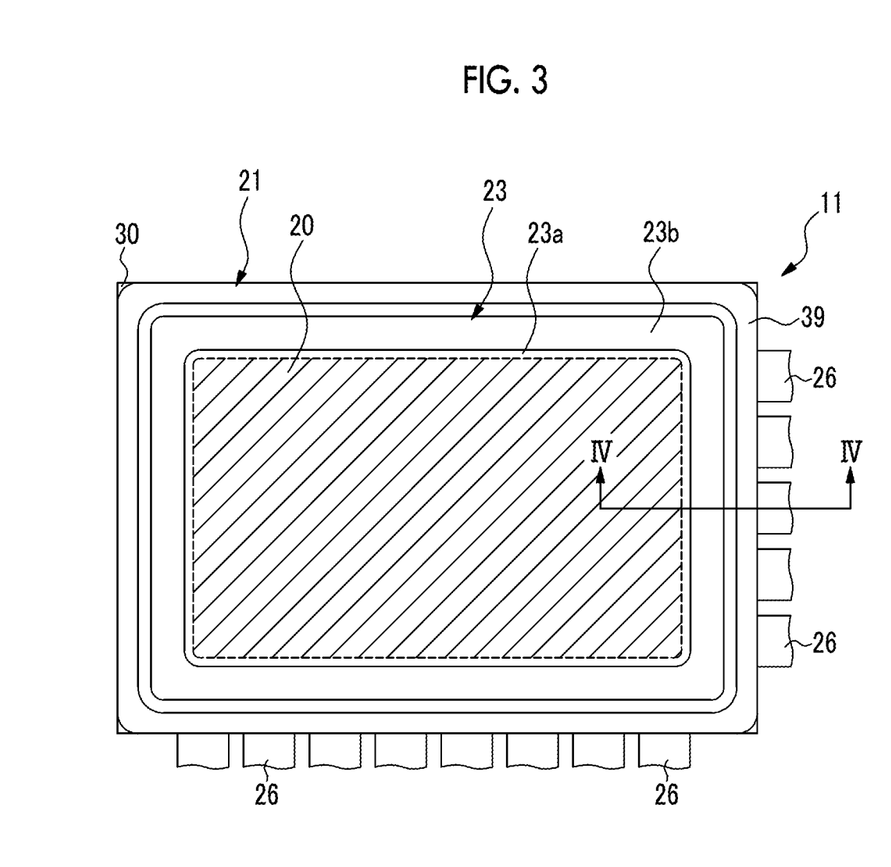
FIG. 3 is a plan view of an FPD.
Figure 4:
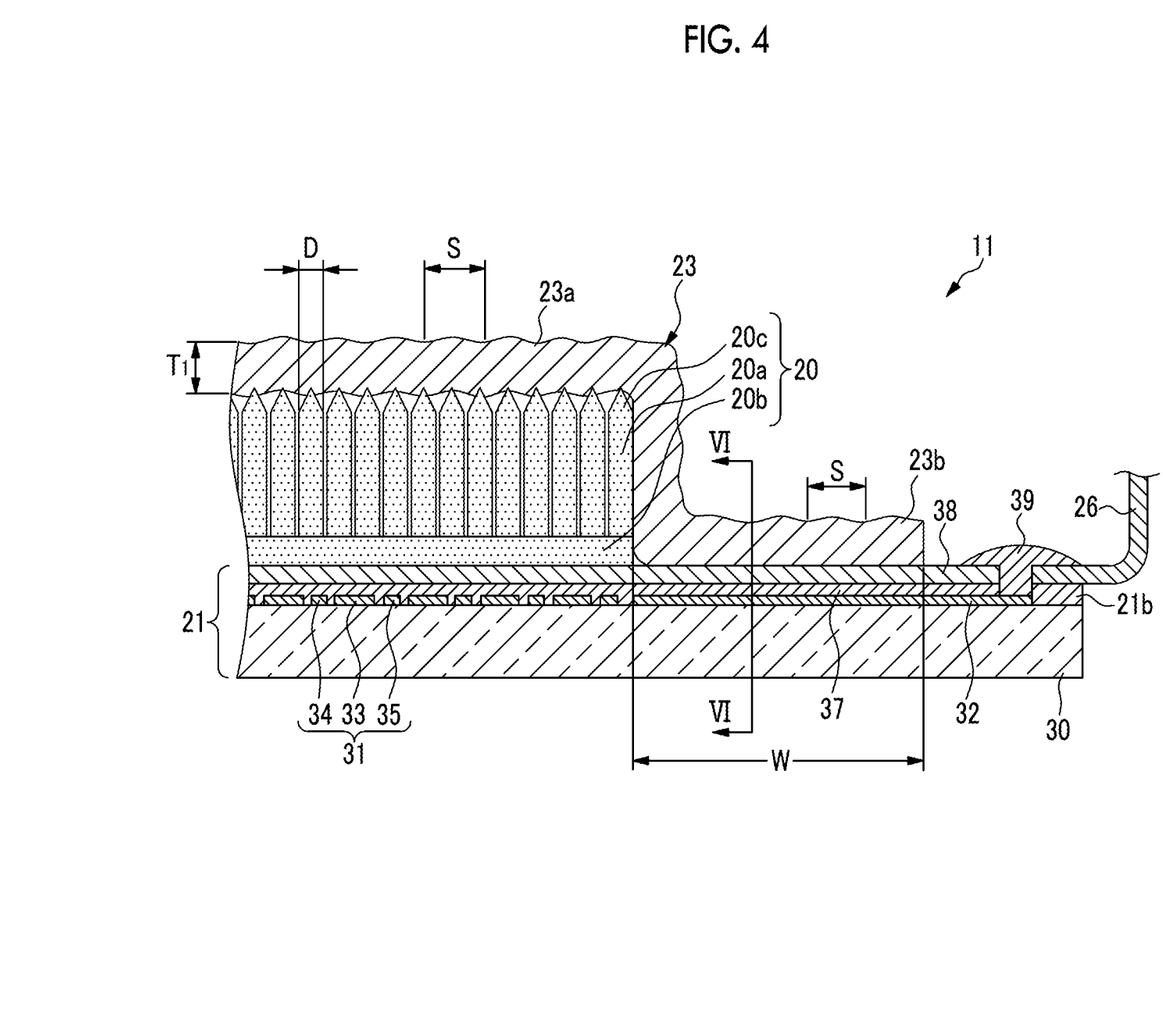
FIG. 4 is a cross-sectional view taken along the line IV-IV of FIG. 3.

FIG. 3 is a plan view when the FPD 11 is viewed from the scintillator 20 side in the direction of A of FIG. 2, and FIG. 4 is a cross-sectional view taken along the line IV-IV of FIG. 3. The photoelectric conversion panel 21 includes an insulating substrate 30 formed of alkali-free glass or the like and a plurality of pixels 31 and wiring lines 32 arrayed on the insulating substrate 30. In order to improve X-ray transparency, it is preferable that the thickness of the insulating substrate 30 be 0.5 mm or less.

Each pixel 31 is formed by a photoelectric conversion element (photodiode: PD) 33, a capacitor 34, and a thin film transistor (TFT) 35. The PD 33 generates electric charges by performing photoelectric conversion of the visible light generated by the scintillator 20. The PD 33 and the capacitor 34 store the electric charges. The TFT 35 is a switching element for reading the electric charges stored in the PD 33 and the capacitor 34. The wiring lines 32 are connected to the respective pixels 31 and the external terminal 21b. The wiring lines 32 include a gate line for supplying the gate signal of the gate driver 26a to the TFT 35 and a data line for transmitting the electric charges read from the TFT 35 to the charge amplifier 26b.

On the insulating substrate 30, a pixel protection film 37 formed of silicon nitride (SiNx) or the like is provided so as to cover the pixels 31 and the wiring lines 32. In addition, the scintillator base film 38 for improving the adhesion of the scintillator 20 while making the top of the insulating substrate 30 flat is provided on the pixel protection film 37. An organic material having heat resistance, such as polyimide or parameter-xylylene, is used for the scintillator base film 38. In order to prevent the corrosion of the wiring lines 32 due to moisture, the edge of the scintillator base film 38 and the edge of the flexible printed circuit board 26 attached to the external terminal 21b are sealed with a sealing member 39 having a moisture-proof property.

The scintillator 20 is formed on the scintillator base film 38. On the scintillator base film 38, the non-columnar crystal layer 20b is formed by vacuum deposition. The non-columnar crystal layer 20b is formed of a plurality of particle-like crystals, and has a high adhesion to the scintillator base film 38 since a gap between crystals is small (space filling rate is high). The thickness of the non-columnar crystal layer 20b is about 5 μm. The columnar crystal 20a is formed by crystal growth from the non-columnar crystal layer 20b using vacuum deposition. The diameter D of the columnar crystal 20a is approximately the same along the longitudinal direction, and is about 3 μm to 20 μm.

The scintillator protection film 23 is provided around the scintillator 20 as described above. The scintillator protection film 23 includes a covering portion 23a, which covers an upper surface and a side surface of the scintillator 20, and a peripheral portion 23b, which is in close contact with the scintillator base film 38 of the photoelectric conversion panel 21 around the scintillator 20. The width W of the peripheral portion 23b is set to 2 mm to 10 mm, for example, in order to appropriately seal the scintillator 20 in close contact with the photoelectric conversion panel 21. In addition, the thickness $T_1$ of the scintillator protection film 23 is set to 30 μm to 100 μm, for example, in order to appropriately seal the scintillator 20 and prevent the breakage at the time of covering.

The scintillator protection film 23 is formed of an adhesive or hot melt resin having a moisture-proof property. As the adhesive, for example, a sheet-like adhesive, such as Panamax clean PD-R5 (PANAC Co., Ltd; "Panaclean" is a registered trademark) or DAITAC ZB7032W; such as (DIC Corporation; "DAITAC" is a registered trademark), is used. As the hot-melt resin, polyester SP170 (Nippon Synthetic Chemical Industry Co., Ltd.; "polyester" is a registered trademark), Hirodine 7589 (Yasuhara Chemical Co., Ltd.), or Aronmeruto PES-111EE (Toa Gosei Co., Ltd.; "Aronmeruto" is a registered trademark) is used.

When the scintillator protection film 23 is provided on the scintillator 20, the covering portion 23a and the peripheral portion 23b are brought into close contact with the scintillator 20 and the photoelectric conversion panel 21 by a planar member (for example, a sponge with a closed cell structure) having an irregular shape at least on the surface. In the covering portion 23a and the peripheral portion 23b of the scintillator protection film 23, an irregular shape is formed along the irregular shape of the planar member. In the irregular shape of the scintillator protection film 23, a distance S between recesses of the surface irregularities is set to satisfy "D≤S≤W" for the diameter D of the columnar crystal 20a and the width W of the peripheral portion 23b. For example, the distance S is about 500 μm. In the irregular shape of the scintillator protection film 23, the height H between a recess and a projection of the surface irregularities is 5 μm to 30 μm, for example.

Figure 5:
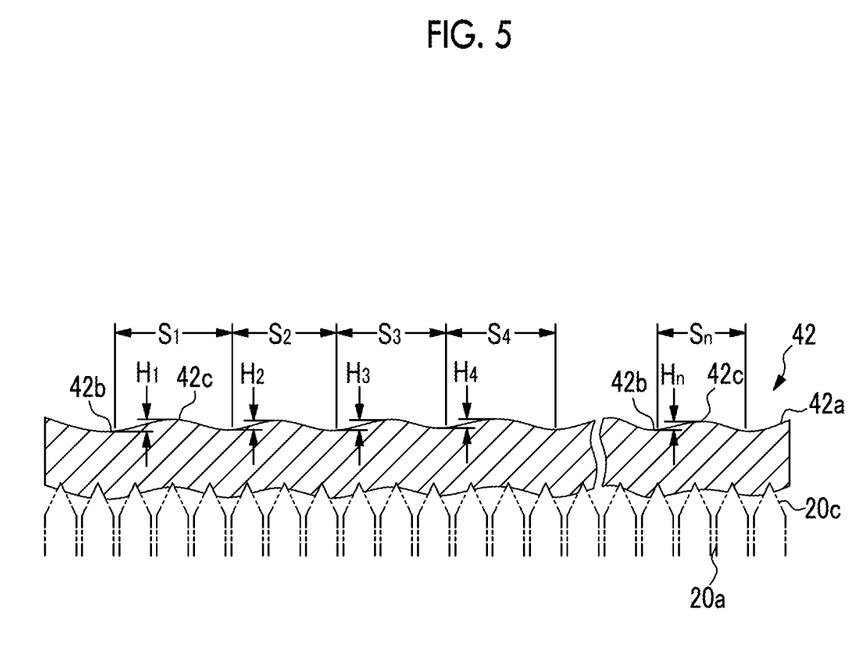
FIG. 5 is a cross-sectional view showing a sample of a scintillator protection film.

As shown in FIG. 5, the distance S between recesses of the surface irregularities of the scintillator protection film 23 is obtained, for example, by acquiring a sample 42 with a reference length from the scintillator protection film 23 covering the scintillator 20 based on the JIS standard "JIS B 0601: 2001" of surface roughness, measuring distances $S_1$ to $S_n$ between a plurality of recesses 42b formed on a surface 42a (not facing the scintillator 20) of the sample 42, and calculating the average value. The height H between the surface irregularities of the scintillator protection film 23 is obtained by measuring a plurality of distances $H_1$ to $H_n$ between the recesses 42b and projections 42c, which are formed on the surface 42a of the same sample 42, and calculating the average value. A minimum value or a maximum value measured from the sample 42 may be used as the distance S between recesses and the height H between irregularities. For the height H between irregularities, it is possible to use a value calculated by the arithmetic average roughness or the ten-point average roughness defined by the JIS standard of surface roughness described above.

In the present embodiment, an irregular shape is formed on the scintillator protection film 23, and the distance S between recesses of the surface irregularities of the irregular shape and the diameter D of the columnar crystal 20a satisfy the relationship of "D≤S". However, in the case of the relationship of "D>S", when pressing the scintillator protection film 23 against the scintillator 20 to cover the scintillator 20, a force is applied to the respective distal ends 20c of the columnar crystal 20a in different directions. As a result, since each distal end 20c may be brought into contact with the columnar crystal 20a adjacent thereto, each distal end 20c of the columnar crystal 20a may be damaged. In the present embodiment, since the relationship of "D≤S" is satisfied, a force is applied to each distal end 20c of the columnar crystal 20a in an almost uniform direction. Therefore, damage to each distal end 20c of the columnar crystal 20a is prevented.

In a known radiation image detection device, the scintillator protection film 23 is brought into close contact with the substrate (photoelectric conversion panel 21) by hot pressing the peripheral portion 23b of the scintillator protection film 23 after covering the scintillator 20 with the scintillator protection film 23. In the present embodiment, however, an irregular shape is formed on the scintillator protection film 23, and the distance S between recesses of the surface irregularities and the width W of the peripheral portion 23b satisfy the relationship "S≤W". Accordingly, a variation in the force by which the peripheral portion 23b is pressed against the photoelectric conversion panel 21 occurs. Specifically, by the relationship of "S≤W", at least one recess is generated in the peripheral portion 23b, and this recess is pressed against the substrate (photoelectric conversion panel 21) with a strong force. Therefore, in the present embodiment, the peripheral portion 23b can be brought into close contact with the photoelectric conversion panel 21 without hot pressing.

Figure 6:
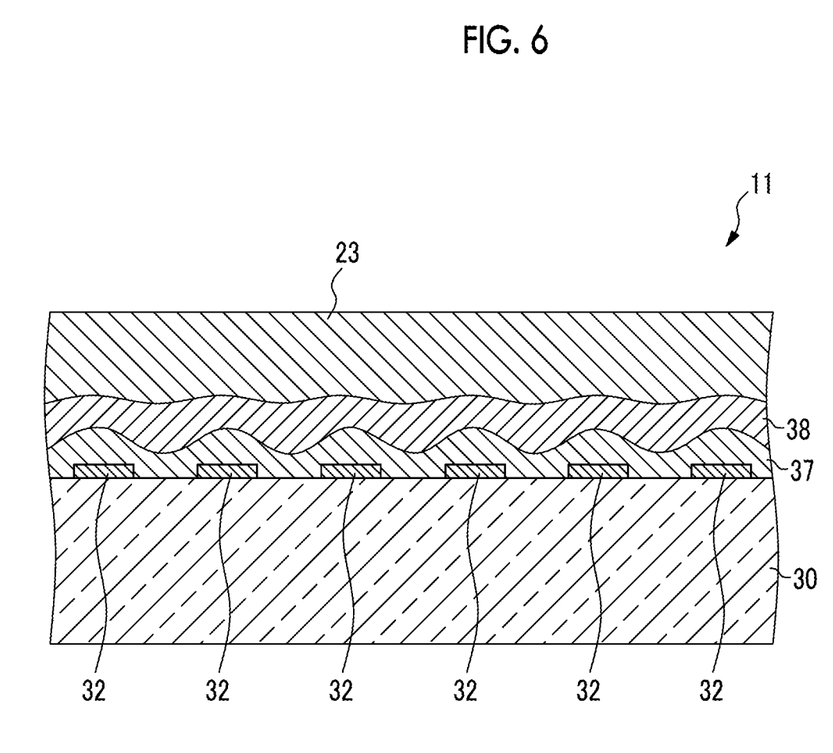
FIG. 6 is a cross-sectional view taken along the line VI-VI of FIG. 4.
Figure 7:
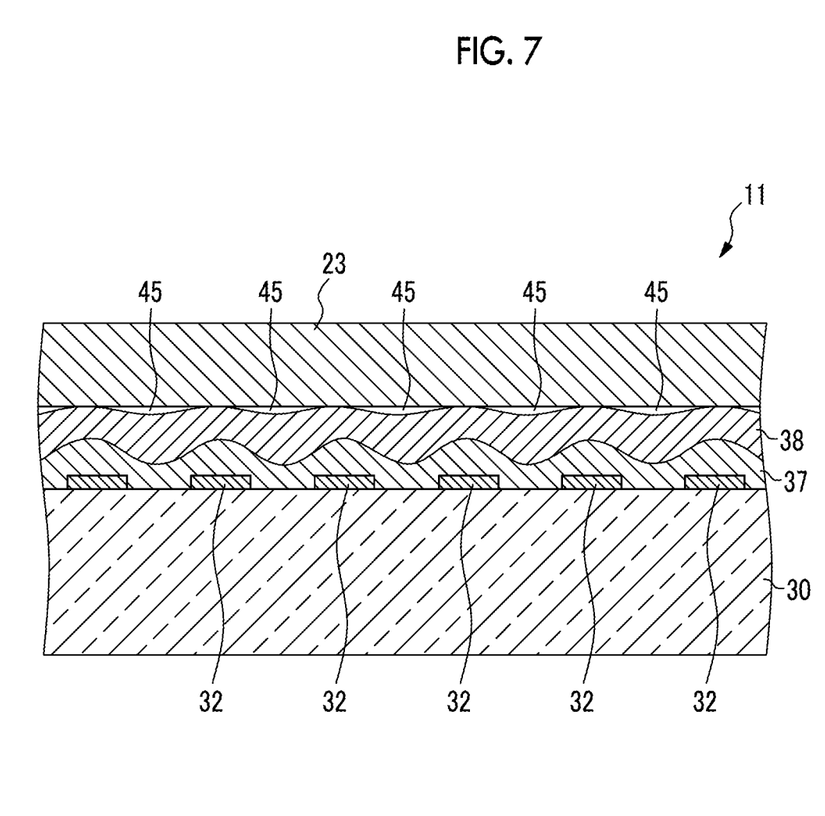
FIG. 7 is a cross-sectional view of the FPD showing a state where a gap is generated in a layer.

FIG. 6 is a cross-sectional view taken along the line VI-VI of FIG. 4, which shows a portion where the peripheral portion 23b is provided. On the surface of the pixel protection film 37, irregularities are generated due to the presence of the wiring lines 32. In order to reduce the irregularities, the scintillator base film 38 that functions as a planarizing layer is provided. However, the surface of the scintillator base film 38 does not become completely flat, and is slightly irregular. Even if the scintillator protection film 23 is formed on such a surface, the scintillator protection film 23 may not sufficiently follow the irregularities of the scintillator base film 38 and there may be a slight gap 45 between the scintillator base film 38 and the scintillator protection film 23, as shown in FIG. 7. In the related art, hot pressing is performed in order to prevent the gap 45. However, according to the present embodiment, as shown in FIG. 6, even if hot pressing is not performed, the scintillator base film 38 and the scintillator protection film 23 are brought into close contact with each other. Therefore, the gap 45 is less likely to be generated between the scintillator base film 38 and the scintillator protection film 23.

Figure 8:
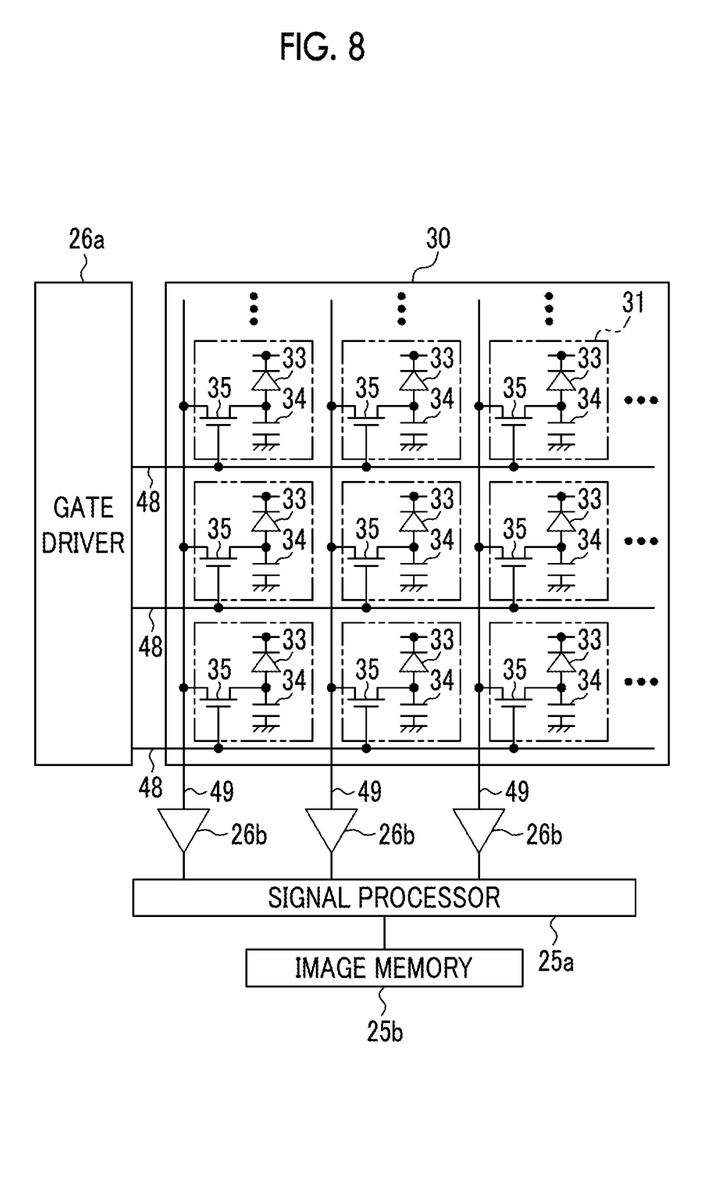
FIG. 8 is a circuit diagram showing the configuration of a photoelectric conversion panel.

In FIG. 8, the pixels 31 are arrayed in a two-dimensional matrix on the insulating substrate 30. As described above, each pixel 31 includes the PD 33, the capacitor 34, and the TFT 35. Each pixel 31 is connected to a gate line 48 and a data line 49 that are wiring lines 32. The gate line 48 extends in a row direction, and a plurality of gate lines 48 are arrayed in a column direction. The data line 49 extends in a column direction, and a plurality of data lines 49 are arrayed in a row direction so as to cross the gate lines 48. The gate line 48 is connected to the gate electrode of the TFT 35. The data line 49 is connected to the drain electrode of the TFT 35.

One end of the gate line 48 is connected to the gate driver 26a. One end of the data line 49 is connected to the charge amplifier 26b. The gate driver 26a applies a gate driving signal sequentially to each gate line 48, thereby turning on the TFT 35 connected to each gate line 48. When the TFT 35 is turned on, electric charges stored in the PD 33 and the capacitor 34 are output to the data line 49.

The charge amplifier 26b converts the electric charges output to the data line 49 into a voltage signal by integrating the electric charges. The signal processor 25a generates image data by performing A/D conversion, gain correcting processing, or the like on the voltage signal output from the charge amplifier 26b. The image memory 25b is a flash memory or the like, and stores the image data generated by the signal processor 25a. The image data stored in the image memory 25b can be read to the outside through a cable or wireless communication unit (not shown).

Figure 9:
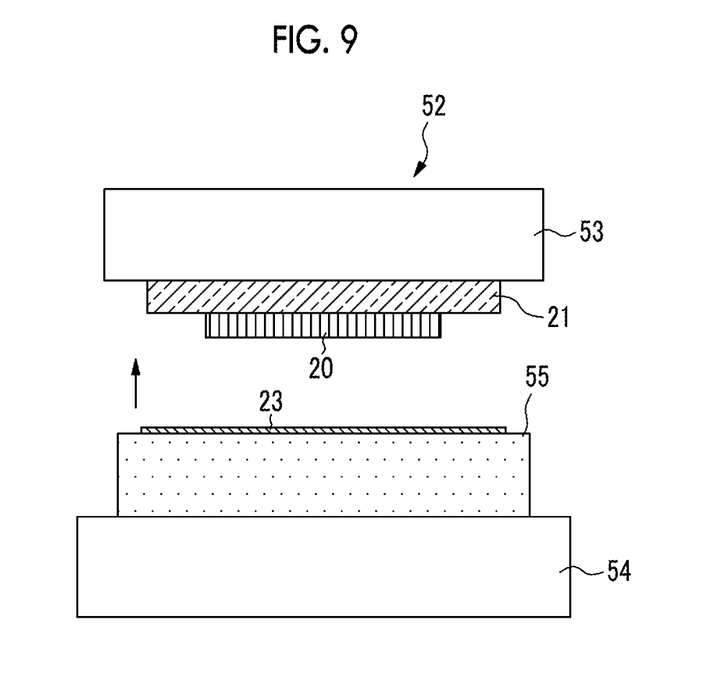
FIG. 9 is an explanatory diagram of a bonding device used to cover the scintillator protection film.

Next, a step of covering the scintillator 20 with the scintillator protection film 23 in a method for manufacturing the X-ray image detection device 10 will be described. A bonding device 52 shown in FIG. 9 is a device that covers the scintillator 20 with the scintillator protection film 23 formed of an adhesive material. The bonding device 52 includes an upper stage 53 that holds the photoelectric conversion panel 21 by air suction or the like with the scintillator 20 facing downward, a lower stage 54 disposed below the upper stage 53, and a plate-shaped planar member 55 provided on the upper surface of the lower stage 54.

The planar member 55 is formed of an elastic material having an irregular shape at least on the surface. As the elastic material, a sponge with a closed cell structure, foam resin, rubber, gel, and the like can be mentioned. Among these, the sponge with a closed cell structure is preferable.

In the sponge with a closed cell structure, fine irregularities are formed on the surface from the beginning due to a large number of bubbles. Therefore, the sponge with a closed cell structure can be directly used to form irregularities on the scintillator protection film 23. In the sponge with a closed cell structure, each bubble is independent without being connected to other bubbles, unlike a sponge with an open cell structure where bubbles are connected to each other. Accordingly, it is possible to obtain elasticity by which the scintillator protection film 23 can be pressed with the appropriate pressure and resilience to return to the original shape appropriately after pressing.

A number of sponges with a closed cell structure are present, and a rubber sponge is preferable in order to cover the scintillator protection film 23. More preferably, a fluorine rubber sponge that has excellent heat resistance and weather resistance and can be used for a long period of time is used. As the fluorine rubber sponge, FR-200, FR-350 (San Polymer Co., Ltd.), FR335, FR235 (Tigers Polymer Co., Ltd.), or FSB735N (Kureha Elastomer Co., Ltd.) can be used.

When a sponge with a closed cell structure is used as the planar member 55, the thickness is preferably 1 mm to 10 mm, for example. More preferably, the thickness of the planar member 55 is about 10 times the thickness of the scintillator 20. Therefore, for example, when the thickness of the scintillator 20 is 500 μm, the thickness of the planar member 55 is preferably 5 mm that is 10 times the thickness of the scintillator 20.

Figure 10:
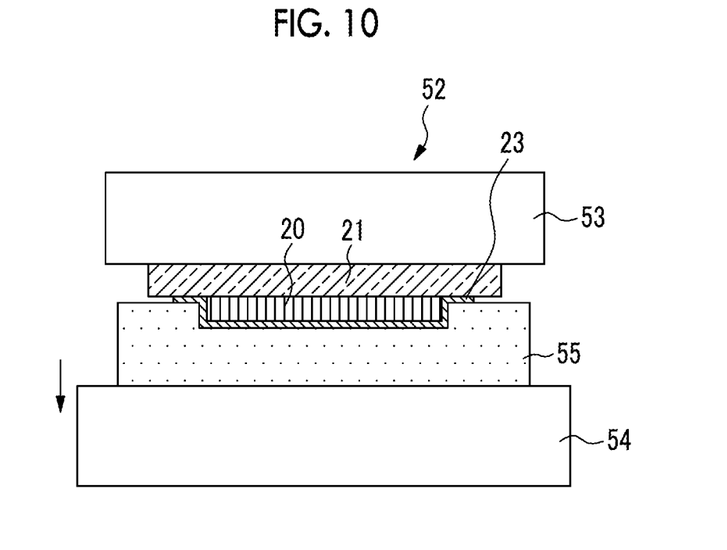
FIG. 10 is an explanatory diagram showing a bonding device while covering the scintillator protection film.

When the photoelectric conversion panel 21 is held by the upper stage 53 and the sheet-like scintillator protection film 23 is placed on the planar member 55, the bonding device 52 lifts the lower stage 54 toward the upper stage 53 using a lifting mechanism (not shown), as shown in FIG. 10. The planar member 55 is deformed according to the shape of the scintillator 20 and the photoelectric conversion panel 21, and presses the scintillator protection film 23 against the scintillator 20 and the photoelectric conversion panel 21 with the same force. Then, the covering portion 23a and the peripheral portion 23b of the scintillator protection film 23 are brought into close contact with the scintillator 20 and the photoelectric conversion panel 21, and an irregular shape of the surface of the planar member 55 is formed on the scintillator protection film 23. In addition, the applied pressure of the planar member 55 using a sponge with a closed cell structure is preferably about 0.1 Mpa to 0.8 Mpa.

As described above, since the distance S between recesses of the surface irregularities of the scintillator protection film 23 and the diameter D of the columnar crystal 20a satisfy the relationship of "D≤S", a force is applied to each distal end 20c of the columnar crystal 20a in an almost uniform direction. Therefore, damage to each distal end 20c of the columnar crystal 20a is prevented. In addition, since the distance S between recesses of the surface irregularities of the scintillator protection film 23 and the width W of the peripheral portion 23b satisfy the relationship of "S≤W", the peripheral portion 23b is pressed against the substrate (photoelectric conversion panel 21) with a strong force at the position of at least one recess. Therefore, the peripheral portion 23b can be brought into close contact with the photoelectric conversion panel 21 without hot pressing. For this reason, a gap is less likely to be generated between the scintillator base film 38 and the scintillator protection film 23.

After forming the scintillator protection film 23, the lower stage 54 is lowered by a lifting mechanism (not shown). The photoelectric conversion panel 21 after the scintillator 20 is covered by the scintillator protection film 23 is taken out from the upper stage 53 after the lowering of the lower stage 54.

When covering the scintillator 20 with the scintillator protection film 23 formed of hot melt resin, a heater may be provided in the upper stage 53 and the lower stage 54 of the bonding device 52. Then, the scintillator protection film 23 is heated and melted by the heater, and then the scintillator protection film 23 is bonded to the scintillator 20 using the planar member 55. After bonding the scintillator protection film 23 and the scintillator 20 to each other, the heating of the heater is stopped to solidify the scintillator protection film 23. In this manner, the scintillator protection film 23 is brought into close contact with the scintillator 20 and the photoelectric conversion panel 21.

As described above, in one step using the bonding device 52, the scintillator 20 is covered by the covering portion 23a without damaging the scintillator 20, and the scintillator protection film 23 is formed so that the peripheral portion 23b has a high adhesion to the photoelectric conversion panel 21.

Next, an operation of the X-ray image detection device 10 will be described. First, X-rays are emitted from an X-ray source toward a subject. X-rays carrying an X-ray image of the subject after being transmitted through the subject are incident on the X-ray image detection device 10 from the photoelectric conversion panel 21 side. The X-rays incident on the X-ray image detection device 10 are incident on the scintillator 20 after being transmitted through the photoelectric conversion panel 21.

The scintillator 20 generates visible light by absorbing the incident X-rays. The generation of visible light in the scintillator 20 mainly occurs on the non-columnar crystal layer 20b side in the columnar crystal 20a. By the light guide effect, the visible light generated in each columnar crystal 20a propagates through the columnar crystal 20a, and is incident on the photoelectric conversion panel 21 through the non-columnar crystal layer 20b.

The visible light incident on the photoelectric conversion panel 21 is converted into electric charges by the PD 33 for each pixel 31, and the electric charges are stored in the PD 33 and the capacitor 34. After the irradiation of X-rays from the radiation source ends, a gate driving signal is sequentially applied to the gate electrode of the TFT 35 through the gate line 48 by the gate driver 26a. As a result, the TFTs 35 arrayed in the row direction are turned on sequentially in the column direction, and electric charges stored in the PD 33 and the capacitor 34 are output to the data line 49 through the TFT 35 in the ON state.

The electric charges output to the data line 49 are converted into a voltage signal by the charge amplifier 26b, and the voltage signal is input to the signal processor 25a. By the signal processor 25a, image data is generated based on the voltage signals for all pixels 31. The image data is stored in the image memory 25b.

As described above, in the X-ray image detection device 10 used for X-ray imaging, the scintillator 20 does not deliquesce because the scintillator protection film 23 covers the scintillator 20. The peripheral portion 23b of the scintillator protection film 23 is brought into close contact with the photoelectric conversion panel 21 by the planar member 55 having an irregular shape on the surface. Accordingly, the peripheral portion 23b is not easily peeled off from the photoelectric conversion panel 21. When bonding the scintillator protection film 23 to the scintillator 20, the scintillator protection film 23 is brought into close contact with the scintillator 20 by the planar member 55 having an irregular shape on the surface. Accordingly, damage to the columnar crystal 20*a* of the scintillator 20 is prevented.

Figure 11:
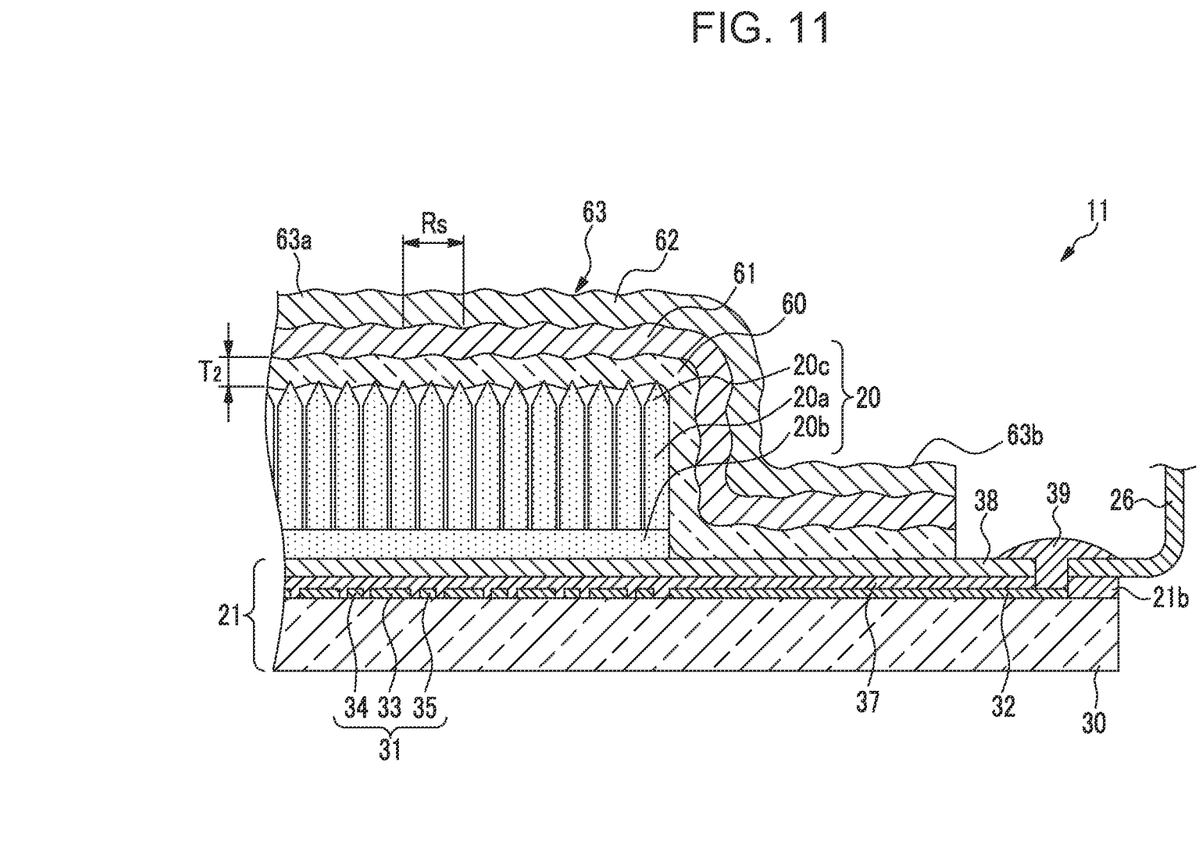
FIG. 11 is a cross-sectional view of an FPD that includes a scintillator protection film having a reflective layer.

In the above embodiment, an example of covering the scintillator 20 with the scintillator protection film 23 of a single layer has been described. However, as shown in FIG. 11, it is also possible to use a scintillator protection film 63 in which a reflective layer 61, which reflects visible light generated in the scintillator 20 toward the photoelectric conversion panel 21, and a reflective layer protection layer 62 are formed on a scintillator protection layer 60 that covers the scintillator 20. Similar to the scintillator protection film 23 of the embodiment described above, the scintillator protection layer 60 is formed of an adhesive material or hot melt resin, and the average thickness T2 is 30 μm to 100 μm, for example. Since visible light needs to be transmitted through the scintillator protection layer 60, it is preferable to use a highly transparent adhesive material or hot melt resin. The reflective layer 61 is formed of, for example, aluminum, and the thickness is 5 μm to 50 μm. The reflective layer protection layer 62 is formed of polyethylene terephthalate (PET) or nylon, and the thickness is 10 μm to 100 μm.

Similar to the scintillator protection film 23 of the embodiment described above, the scintillator protection film 63 covers the scintillator 20 using the bonding device 52 that includes the planar member 55 having an irregular shape on the surface. Therefore, in the scintillator protection film 63, the irregular shape of the planar member 55 is formed not only in the scintillator protection layer 60 but also in the reflective layer 61 and the reflective layer protection layer 62. In the scintillator protection film 63 of the present embodiment, a distance $R_s$ between recesses on the surface side of the irregular shape formed on the reflective layer 61 and the average thickness $T_2$ of the scintillator protection layer 60 satisfy the relationship of "$T_2 \leq R_S$". Therefore, since the irregular shape of the reflective layer 61 is not extremely fine, it is possible to prevent irregular reflection of visible light by the reflective layer 61. As in the embodiment described above, the distance $R_s$ between recesses and the average thickness $T_2$ can be calculated by acquiring a sample from the scintillator protection film 63 and measuring the sample.

In the scintillator protection film 63, a distance S between recesses of the irregular shape of the scintillator protection layer 60, the width W of a peripheral portion 63*b*, and the diameter D of the columnar crystal 20*a* also satisfy the relationship of "D≤S≤W" as in the embodiment described above. Accordingly, the columnar crystal 20*a* is not damaged when covering the scintillator 20 with the scintillator protection film 63. Even if hot pressing is not performed, the peripheral portion 63*b* of the scintillator protection film 63 can be brought into close contact with the photoelectric conversion panel 21.

In addition, a "substrate that supports a scintillator" described in the appended claims corresponds to the photoelectric conversion panel 21 in the present embodiment. Although the scintillator 20 is provided on the scintillator base film 38 provided on the surface layer of the photoelectric conversion panel 21 in the present embodiment, the scintillator base film 38 may be omitted.

In the above embodiment, the scintillator 20 directly deposited on the photoelectric conversion panel 21 has been described as an example. However, the invention can also be applied to a bonding type scintillator that is bonded to the photoelectric conversion panel 21 after being deposited on a deposition substrate. When applying the invention to the bonding type scintillator, a peripheral portion of the scintillator protection film is brought into close contact with the deposition substrate.

In each embodiment described above, the scintillator 20 using CsI has been described as an example. However, the invention can also be applied to a scintillator that is not columnar-crystallized, such as GOS.

In each embodiment described above, the ISS type X-ray image detection device 10 has been described as an example in which the photoelectric conversion panel 21 is disposed so as to be closer to the X-ray incidence side than the scintillator 20. However, the invention can also be applied to a penetration side sampling (PSS) type X-ray image detection device in which the scintillator 20 is disposed so as to be closer to the X-ray incidence side than the photoelectric conversion panel 21.

In addition, although X-rays are used as a radiation in the embodiment described above, it is also possible to use radiations other than X-rays, such as γ-rays or α-rays. In the above embodiment, the invention has been described using the electronic cassette, which is a portable radiation image detection device, as an example. However, the invention can also be applied to a standing or sitting type radiation image detection device, a mammographic device, and the like.

What is claimed is:

1. A radiation image detection device, comprising:
   a planar scintillator that converts radiation into visible light;
   a substrate that supports the scintillator; and
   scintillator protection film that includes a covering portion that covers a surface of the scintillator and a peripheral portion that is in close contact with the substrate around the scintillator, the covering portion and the peripheral portion being brought into close contact with the scintillator and the substrate by a planar member having a rough surface so that irregularities are formed on the surface of the covering portion and the peripheral portion, wherein
   the irregularities form a plurality of recesses and projections along an upper surface of a cross-section of the covering portion and the peripheral portion,
   the scintillator has a plurality of columnar crystals, and
   a distance between two of the plurality of recesses formed by the irregularities is larger than a diameter of one of the plurality of columnar crystals and is smaller than a width of the peripheral portion.

2. The radiation image detection device according to claim 1, wherein the planar member is a sponge with a closed cell structure.

3. The radiation image detection device according to claim 2, wherein a height from a recess to a projection of the surface is 5 μm to 30 μm.

4. The radiation image detection device according to claim 3, wherein the scintillator protection film, is an adhesive or hot inch resin.

5. The radiation image detection device according to claim 3, wherein
   the substrate is a photoelectric conversion panel in which a plurality of pixels, which generate electric Charges by photoelectric conversion, are disposed, and
   the scintillator is deposited on the photoelectric conversion panel.

6. The radiation image detection device according to claim 2, wherein the scintillator protection film is an adhesive or hot melt resin.

7. The radiation image detection device according to claim 2,
wherein the substrate is a photoelectric conversion panel in which a plurality of pixels, which generate electric charges by photoelectric conversion, are disposed, and the scintillator is deposited on the photoelectric conversion panel.

8. The radiation image detection device according to claim 1, wherein a height from a recess to a projection of the surface is 5 μm to 30 μm.

9. The radiation image detection device according to claim 8, wherein the scintillator protection film is an adhesive or hot melt resin.

10. The radiation image detection device according to claim 8, wherein
the substrate is a photoelectric conversion panel h a plurality of pixels, which generate electric charges by photoelectric conversion, are disposed, and
the scintillator is deposited on the photoelectric conversion panel.

11. The radiation image detection device according to claim 1, wherein the scintillator protection film is an adhesive or hot melt resin.

12. The radiation image detection device according to claim 1,
wherein the substrate is a photoelectric conversion panel in which a plurality of which generate electric charges by photoelectric, conversion, are disposed, and
the scintillator is deposited on the photoelectric conversion panel.

13. The radiation image detection device according to claim 1, wherein the scintillator protection film includes a scintillator protection layer that protects the scintillator, light reflection layer that is provided on an outer side of the scintillator protection layer and reflects visible light emitted from the seintillator, and a reflective layer protection layer provided on an outer side of the light reflection layer.

14. The radiation image detection device according to claim 13, wherein a distance between recesses of the surface irregularities is larger than an average thickness of the scintillator protection layer.

15. A method for manufacturing a radiation image detection device according to claim 1, that includes a planar scintillator for converting radiation into visible light and generates a radiation image by performing photoelectric conversion of the visible light, the method comprising: providing the scintillator on a substrate; providing a sheet-like scintillator protection film, which includes a covering portion that covers the scintillator and a peripheral portion that is in close contact with the substrate at a periphery of the covering portion so as to face the scintillator; and forming irregularities on the surface of the scintillator protection film by bringing the covering portion and the peripheral portion into close contact with the scintillator and the substrate using a planar member having a rough surface, wherein the irregularities form a plurality of recesses and surface of a cross-section of the covering portion and the peripheral portion, and the scintillator has a plurality of columnar crystals, and a distance between two of the plurality of recesses formed by the irregularities is larger than a diameter of one of the plurality of columnar crystals and is smaller than a width of the peripheral portion.

16. The method for manufacturing a radiation image detection device according to claim 15, wherein
the planar member is a sponge with a closed cell structure, and
the scintillator protection film is pressed with a pressure of 0.1 Mpa to 0.8 Mpa.

* * * * *